United States Patent [19]

Blaushild

[11] Patent Number: 4,629,601
[45] Date of Patent: Dec. 16, 1986

[54] STIRRUP-TYPE SUPPORT STRUCTURE FOR NUCLEAR POWER PLANT PRESSURIZER VALVES

[75] Inventor: Ronald M. Blaushild, Wilkinsburg, Pa.

[73] Assignee: Westinghouse Electric Corp., Pittsburgh, Pa.

[21] Appl. No.: 569,073

[22] Filed: Jan. 9, 1984

[51] Int. Cl.[4] ............................................. G21C 15/18
[52] U.S. Cl. ................................. 376/463; 376/283; 376/461
[58] Field of Search ............... 376/461, 283, 361, 249, 376/307, 203, 260, 463, 302, 304; 248/DIG. 1, 315, 213.2; 220/69, 71, 85 P

[56] References Cited

U.S. PATENT DOCUMENTS 2,998,370 8/1961 Gaunt et al. ........................ 376/304
4,426,350 1/1984 Zegar ............................. 376/203 X Primary Examiner—Stephen C. Bentley
Assistant Examiner—John S. Maples

[57] ABSTRACT

A support structure for supporting a pressurizer safety and relief valve system above a pressurizer vessel comprises a ring girder which surrounds the pressurizer vessel wall and is supported on pairs of lugs spaced about the pressurizer wall. The ring girder supports columns for the system at locations spaced from the lugs, and support means in the form of frames distribute the load on the lugs. The frames have upper and lower bars and outer vertical bars, with spaced inner vertical bars. Biasing means are provided to attach the frames to the lugs and distribute the forces, and a projection on the ring girder fits into a groove of a support bar on the upper bar of the frame.

12 Claims, 5 Drawing Figures

4,629,601

STIRRUP-TYPE SUPPORT STRUCTURE FOR NUCLEAR POWER PLANT PRESSURIZER VALVES

CROSS-REFERENCE TO RELATED INVENTION

Reference is made to the application of the present inventor, filed in even date herewith, Ser. No. 569,074, entitled "Straddle-Type Support Structure for Nuclear Power Plant Pressurizer Valves".

BACKGROUND OF THE INVENTION

The present invention relates to a support structure for supporting a pressurizer safety and relief valve system above the pressurizer vessel of a pressurized water nuclear reactor power plant.

A pressurizer vessel is used in a pressurized water nuclear reactor power plant to provide relief for coolant overpressure. Usually, such a pressurizer vessel is a vertical, thick walled vessel having a hemispherical top, or dome, and having its bottom end supported by a flanged skirt.

Relief valves are provided for a first level of overpressure protection and safety valves are provided for a second level of overpressure protection. The unit thus comprises a pressurizer relief and safety valve system that has a manifold or header assembly and connections for nozzles in the head of the pressurizer, with piping and discharge outlets provided.

A pressurizer safety and relief valve system which is supported above the pressurizer on columnar supports is described in co-pending application Ser. No. 229,363, now U.S. Pat. No. 4,426,350, dated Jan. 17, 1984, entitled "Improved Valve Support Arrangement for Pressurizer in a Nuclear Power Plant", filed Jan. 29, 1981, in the names of Martin J. Zegar, et al., assigned to the assignee of the present invention, which application is incorporated by reference herein. In said co-pending application, an arrangement for supporting the pressurizer safety and relief valve system is described wherein a common header is secured to the side wall of the pressurizer vessel by the use of columnar supports that are secured to the header and are secured to the pressurizer side wall by the use of lug means. The lug means which are attached to the pressurizer side wall must be capable of supporting the load of the columnar supports and pressurizer safety and relief valve system and could become overstressed for some combinations of loads, and also must be of sufficient dimensions if they are to support the necessary loads.

In the system described in said co-pending application, the main support structure comprises four columnar members equally spaced around the pressurizer vessel and coupled to the lugs on the vessel side wall. A fixed type connection between the lugs and the columnar supports can cause undesirable concentrations of stress and difficulties in fabrication and construction.

It is an object of the present invention to provide a support structure for a pressurizer safety and relief valve system that will ease the stress strain condition of the lugs supporting the system.

It is another object of the present invention to provide a frame for a ring girder, for supporting a pressurizer safety and relief valve system that is sufficiently rigid so as not to bend along a horizontal axis to provide a uniform load on the upper support area of a lug, and sufficiently flexible to provide for possible deflection due to forces caused by temperature variations.

SUMMARY OF THE INVENTION

A support structure, for supporting a pressurizer safety and relief valve system which is mounted on columnar supports above a pressurizer vessel has a ring girder which surrounds the pressurizer vessel wall, the ring girder resting on means for supporting the same on lugs attached to the pressurizer wall, with the columnar supports spaced along the ring girder at a distance from the lugs. The means for supporting the ring girder on the lugs, preferably pairs of spaced lugs, equally spaced around the pressurizer wall, is a frame having upper and lower bars, outer vertical bars, and inner spaced vertical bars. The upper bar has a groove into which a projection on the ring girder seats, and shims and bolts are provided in the frame to attach the frame to the pair of lugs in a manner which evenly distributes vertical and horizontal forces on the lugs.

DETAILED DESCRIPTION OF THE PREFERRED EMBODIMENT

The present support structure for a pressurizer safety and relief valve system of a pressurizer vessel, used in a pressurized water nuclear reactor, is designed to ease the stress strain condition of the lugs supporting the system, which lugs are affixed to the wall of the pressurizer vessel.

Figure 1:
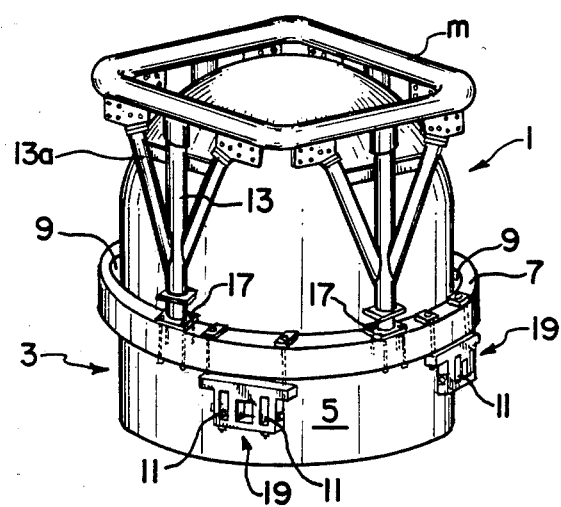
FIG. 1 is a perspective view of the support structure of the present invention showing the manifold but with associated valves and piping removed for clarity.
Figure 2:
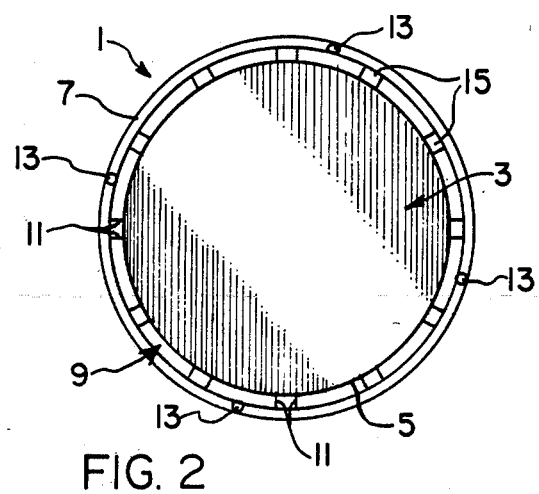
FIG. 2 is a schematic view, from above, of the support structure of FIG. 1, with the manifold, valves, and piping system removed for clarity.

Referring now to FIGS. 1 and 2, there is illustrated a support structure 1, disposed on a pressurizer vessel 3 having a cylindrical wall 5. A ring girder 7 surrounds the wall 5 of the pressurizer vessel 3 and is spaced therefrom to leave a gap 9, the ring girder 7 having frames thereon for supporting the same on spaced pairs of lugs 11 affixed to the pressurizer wall. The columnar supports 13, for the pressurizer safety and relief valve system manifold, are attached to the ring girder 7 and extend upwardly therefrom. These columnar supports 13 preferably have angularly directed struts 13a, which columnar supports support the manifold m and associated piping of the pressurizer safety and relief valve system above the pressurizer vessel. The columnar supports 13 are attached to the ring girder 7 at a location spaced from the frames for supporting the ring girder 7 on the lugs 11. Spacers 15 are provided between the pressurizer side wall 5 and the ring girder 7 as more specifically described hereinafter. The columnar supports 13 are preferably affixed to the ring girder 7 by the use of braces 17.

Figure 3:
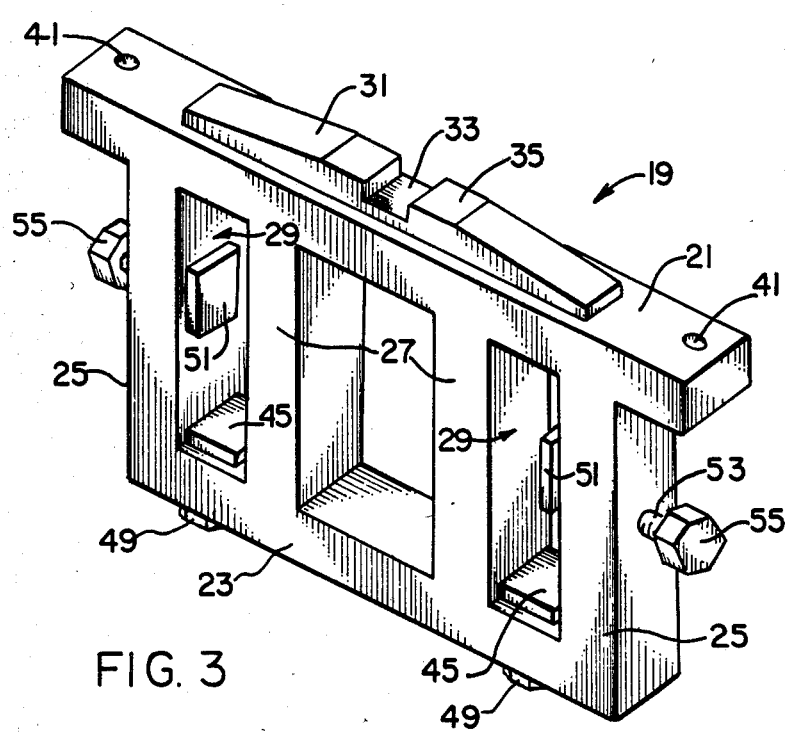
FIG. 3 is a perspective view of the support frame used to support the ring girder on the lugs on the side wall of the pressurizer vessel.

The means for supporting the ring girder 7 on the lugs 11 is illustrated in a perspective view in FIG. 3. The support means, in the form of a frame 19, comprises an upper bar 21, a lower bar 23, and a pair of outer vertical bars 25. Extending between the upper and lower bars 21, 23, and spaced from the outer vertical bars 25, are a pair of spaced inner vertical bars 27, with an opening 29 between each outer vertical bar 25 and adjacent inner vertical bar 27 into which one of the pair of lugs 11 will fit.

A support bar 31 is provided on the top of the upper bar 21, which support bar 31 has a groove 33 in a raised flat surface 35 thereof. The groove 33 is adapted to receive a projection 37 (FIG. 4) that is fixed to the ring girder 7, and shims 39 are provided on either side of the projection 37 for a snug fit. The support frame 19 has apertures 41, through the upper bar 21, into which attachment means, such as bolts 43, will pass which releasably attach the frame 19 to the ring girder 7. The apertures 41 may be slightly oversized or oval shaped so as to prevent the bolts 43 from subjection to horizontal loads.

Figure 4:
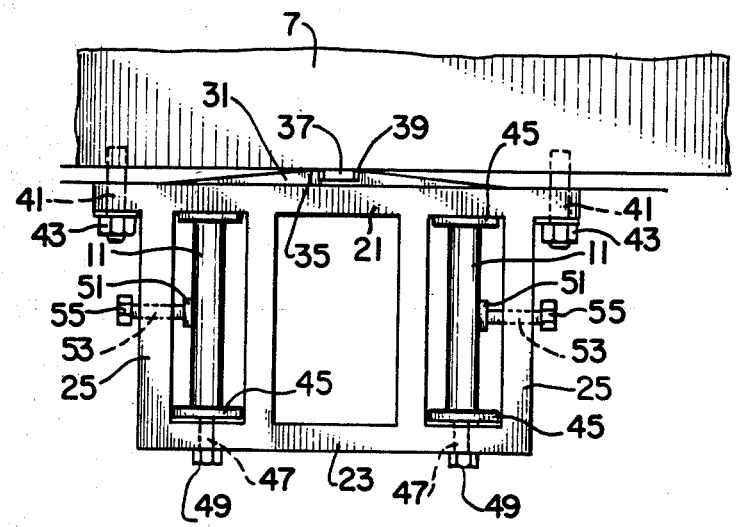
FIG. 4 is a vertical view of a section of the ring girder supported by a support frame resting on the lugs.
Figure 5:
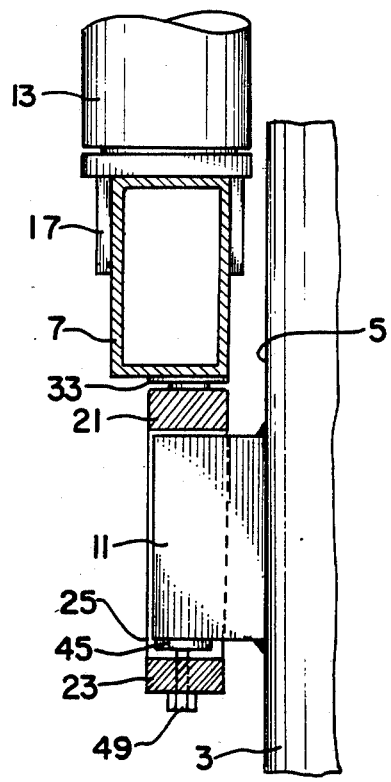
FIG. 5 is a vertical cross-sectional view through a ring girder and support frame.

As illustrated in FIG. 4, the frame 19 fits over a pair of lugs 11, with the lugs fitting into the spacing between the outer vertical bars 25 and spaced inner vertical bars 27, and shims 45 are placed between the top of a lug 11 and the upper bar 21, while further shims 45 are placed between the bottom of a lug 11 and the lower bar 23. Threaded apertures 47 are provided in the lower bar 23, at the location of the lugs 11 and bottom shims 45, and a bolt 49 is threaded therethrough which contacts bottom shims 45 to provide a tight fit against the bottom of the lugs 11 and secure the frame 19 to the lugs 11 and also to bias the shims 45 against the lugs 11. Further side shims 51 are provided, and threaded apertures 53 through the outer vertical bars 25 provided, with a threaded bolt 55 threaded therethrough to secure the frame 19 to the sides of the lugs 11, and bias the shims 51 against the lugs 11.

In the present arrangement, the load supported by the columnar supports 13 is transferred to the ring girder 7 at positions spaced from the lugs 11. The use of the groove 33 in the support bar 31 of frame 19, into which the projection 37 seats, provides for an equalized spreading of the vertical downward forces to the upper bar 21 of the support frames 19, and the projection 37 provides a central application of such forces relative to the ring girder thickness. This eliminates influences of possible ring girder sway and shifting of the vertical forces to the far edge of the lugs 11 of the pressurizer. Vertical upward forces are taken by the bolts 43 and then transferred to the frame 19 to lower bolts 49 and spread through lower shims 45 to the lower surface of the lugs 11 on the pressurizer. Horizontal tangential force is transferred by projection 37, on the ring girder 7, through the groove 33 in the upper bar 21 of the frame 19, then to bolts 55 and to the shims 51. This provides a centrally located application of a load.

The shims 45 and 51 and bolts 49 and 55 provide for a firm contact with the lugs 11 in the case of variations in the size or construction of the surfaces of the lugs 11.

The spacers 15, located between the side wall 5, of the pressurizer vessel 3 and the ring girder 7, are freely inserted in the gap 9 to prevent the structure from accidental radial movement, and may be fitted in grooves (not shown) in the ring girder 7 or otherwise retained in their position between the pressurizer wall and the ring girder.

The use of the present support structure, in addition to evenly distributing loads, provides for an easy removal of a frame 19 for the purpose of inspecting welds in the pressurizer, and also provides for ready placement or removal of the support structure. Such ready installation or removal will result in less labor costs and less possible exposure to radiation during the installation or removal of the support structure.

In the preferred embodiment, four columnar supports 13 are used and four frames 19, spaced from the columnar supports along the ring girder 7, are used to support the pressurizer safety and relief valve system on four pairs of lugs 11 equally spaced around the wall 5 of the pressurizer 3.

The present support system for a pressurizer safety and relief valve system is applicable to new designs of pressurizers, and is also adapted for use on existing pressurizers.

I claim:

1. A support structure for supporting a pressurizer safety and relief valve system of a pressurized water reactor, said system being mounted on columnar supports above a pressurizer vessel comprising:
   a ring girder surrounding the pressurizer wall and spaced therefrom;
   a plurality of pairs of spaced lugs extending outwardly from the pressurizer wall and affixed thereto at a position below said ring girder; and
   frames for supporting said ring girder on said lugs; with said columnar supports being supported by the ring girder at a location spaced from said supporting frames.

2. The support structure for supporting a pressurizer safety and relief valve system of a pressurized water reactor as defined in claim 1 wherein said pairs of spaced lugs are equally spaced around the pressurizer wall, and said frames for supporting said ring girder extend across each of said pair of lugs.

3. The support structure for supporting a pressurizer safety and relief valve system of a pressurized water reactor as defined in claim 1 including a spacer block, positioned between said ring girder and said pressurizer wall, spaced from said frames for supporting said ring girder.

4. The support structure for supporting a pressurizer safety and relief valve system of a pressurized water reactor as defined in claim 3 wherein a plurality of said spacer blocks are provided between adjacent said frames for supporting said ring girder.

5. The support structure for supporting a pressurizer safety and relief valve system of a pressurized water reactor as defined in claim 2 wherein each of said frames for supporting said ring girder is a support frame, secured to said ring girder, having upper and lower bars, outer vertical bars connecting said upper and lower bars, and a pair of spaced inner vertical bars, with each of said lugs positioned between an outer vertical bar and one of said pair of said spaced inner vertical bars.

6. The support structure for supporting a pressurizer safety and relief valve system of a pressurized water reactor as defined in claim 5 wherein said upper bar has a support bar thereon, with a groove in said support bar, and a projection is provided on said ring girder which projection seats within said groove.

7. The support structure for supporting a pressurizer safety and relief valve system of a pressurized water reactor as defined in claim 5 wherein said support frame is releasably secured to said ring girder.

8. The support structure for supporting a pressurizer safety and relief valve system of a pressurized water reactor as defined in claim 5 wherein four of said support frames are provided on said ring girder and four columnar supports extend upwardly from said girder at a location spaced from said frames.

9. The support structure for supporting a pressurizer safety and relief valve system of a pressurized water reactor as defined in claim 6 wherein shims are positioned between said lugs and said upper and lower bars of said support frame.

10. The support structure for supporting a pressurizer safety and relief valve system of a pressurized water reactor as defined in claim 9 including means for biasing the shims at said lower bar against the bottom of said lugs.

11. The support structure for supporting a pressurizer safety and relief valve system of a pressurized water reactor as defined in claim 6 wherein shims are positioned between said outer vertical bars and said lugs.

12. The support structure for supporting a pressurizer safety and relief valve system of a pressurized water reactor as defined in claim 11 including means for biasing said shims against the side of said lugs.

* * * * *